(12) United States Patent
Kato

(10) Patent No.: US 11,773,566 B2
(45) Date of Patent: Oct. 3, 2023

(54) CAB FOR WORK MACHINE AND WORK MACHINE

(71) Applicant: KOMATSU LTD., Tokyo (JP)

(72) Inventor: Yasunari Kato, Tokyo (JP)

(73) Assignee: KOMATSU LTD., Tokyo (JP)

( * ) Notice: Subject to any disclaimer, the term of this patent is extended or adjusted under 35 U.S.C. 154(b) by 568 days.

(21) Appl. No.: 16/966,085

(22) PCT Filed: Mar. 12, 2019

(86) PCT No.: PCT/JP2019/009884
§ 371 (c)(1),
(2) Date: Jul. 30, 2020

(87) PCT Pub. No.: WO2019/230114
PCT Pub. Date: Dec. 5, 2019

(65) Prior Publication Data
US 2021/0025130 A1     Jan. 28, 2021

(30) Foreign Application Priority Data

May 29, 2018   (JP) ................................. 2018-102490

(51) Int. Cl.
| | |
|---|---|
| *B62D 33/06* | (2006.01) |
| *E02F 9/16* | (2006.01) |
| *E05F 15/00* | (2015.01) |
| *E02F 3/28* | (2006.01) |
| *E05F 1/10* | (2006.01) |

(52) U.S. Cl.
CPC ............ *E02F 9/16* (2013.01); *B62D 33/0617* (2013.01); *E05F 15/00* (2013.01); *E02F 3/283* (2013.01); *E05F 1/1091* (2013.01); *E05Y 2201/41* (2013.01); *E05Y 2201/422* (2013.01); *E05Y 2201/478* (2013.01); *E05Y 2900/518* (2013.01); *E05Y 2900/531* (2013.01)

(58) Field of Classification Search
CPC ...... B62D 65/14; B62D 21/183; B62D 25/06; B60N 2/015; B60N 2/02; B60N 2/58; B60N 2/012; B60N 2/305; B60Y 2200/20
USPC ..................................................... 296/190.11
See application file for complete search history.

(56) References Cited

U.S. PATENT DOCUMENTS

| | | | | |
|---|---|---|---|---|
| 7,703,835 | B2 * | 4/2010 | Weeda ...................... | B60P 3/20 |
| | | | | 296/146.1 |
| 10,760,320 | B2 * | 9/2020 | Knechtel ................. | E05F 15/63 |
| 2007/0046070 | A1 | 3/2007 | Hayes et al. | |
| 2008/0120911 | A1 * | 5/2008 | Browne ................. | E05F 15/60 |
| | | | | 49/352 |

(Continued)

FOREIGN PATENT DOCUMENTS

| | | | |
|---|---|---|---|
| CN | 101253091 B | 5/2011 | |
| CN | 107532406 A * | 1/2018 | ............. B60L 53/51 |

(Continued)

*Primary Examiner* — Pinel E Romain
(74) *Attorney, Agent, or Firm* — Faegre Drinker Biddle & Reath LLP

(57) ABSTRACT

Provided are a cab for a work machine and a work machine capable of preventing a door from opening against an operator's intention. The cab includes a cab body, a door, and a gas spring. The cab body is formed with a doorway. The door is rotatably supported on the cab body. The door opens and closes the doorway. The gas spring biases the door in the closing direction.

5 Claims, 6 Drawing Sheets

(56) References Cited

U.S. PATENT DOCUMENTS

2017/0362869 A1  12/2017  Ghantous et al.
2018/0100289 A1   4/2018  Hamaguchi et al.

FOREIGN PATENT DOCUMENTS

| CN | 107532406 A    | 1/2018  |
|----|----------------|---------|
| JP | S61-037432 B2  | 8/1986  |
| JP | 2003-214022 A  | 7/2003  |
| JP | 2004-143687 A  | 5/2004  |
| JP | 3767485 B2     | 4/2006  |
| JP | 2008-196262 A  | 8/2008  |
| JP | 2008-285910 A  | 11/2008 |
| JP | 2013-174046 A  | 9/2013  |
| JP | 2017-43888 A   | 3/2017  |
| KR | 10-2010-0071363 A | 6/2010 |

\* cited by examiner

CAB FOR WORK MACHINE AND WORK MACHINE

TECHNICAL FIELD

The present disclosure relates to a cab for a work machine and a work machine including the cab.

BACKGROUND ART

Conventionally, U.S. Patent Application Publication No. 2017/0362869 (PTL 1) discloses that an access door of an operator cab is biased in a direction away from the cab body by the force of gravity.

CITATION LIST

Patent Literature

PTL 1: U.S. Patent Application Publication No. 2017/0362869

SUMMARY OF INVENTION

Technical Problem

The door disclosed in the above-mentioned document is subjected to a force that comes from the weight of the door in a direction from the closed position to the open position. After the closed door is unlocked, the door starts moving in the opening direction. However, if the door of the prior art moves unintentionally, it may be a problem when a window of the door is under cleaning or the like.

The present disclosure provides a cab for a work machine and a work machine capable of preventing the door from opening against an operator's intention.

Solution to Problem

According to the present disclosure, a cab for a work machine is provided. The cab includes a cab body, a door, and a biasing member. The cab body is formed with a doorway. The door is rotatably supported on the cab body. The door opens and closes the doorway. The biasing member biases the door in the closing direction.

Advantageous Effects of Invention

According to the present disclosure, it is possible to prevent the door from being opened against the operator's intention.

DESCRIPTION OF EMBODIMENTS

Figure 1:
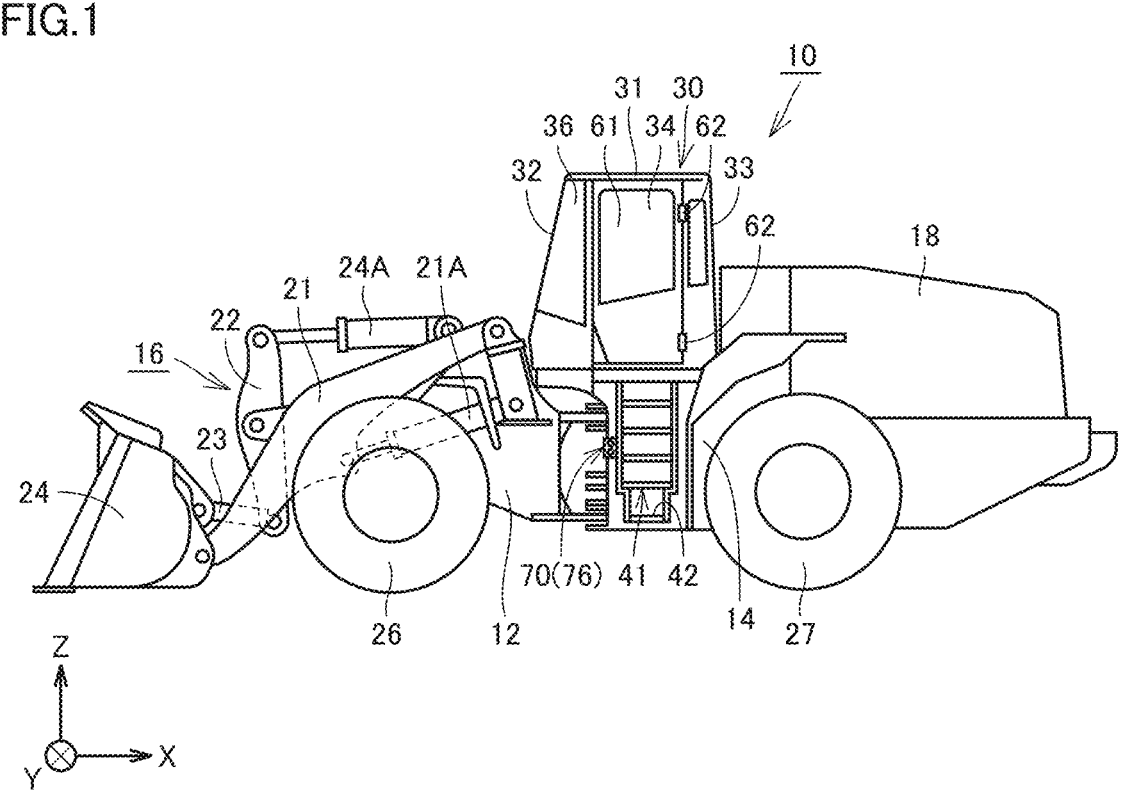
FIG. 1 is a side view illustrating a wheel loader according to an embodiment of the present disclosure.

Hereinafter, embodiments will be described with reference to the drawings. In the following description, the same components will be denoted by the same reference numerals, and may have the same names and the same functions, and thereby, the detailed description thereof will not be repeated.

[Overall Configuration]

In the present embodiment, the configuration of a wheel loader which serves as an example of a work machine to which the idea of the present disclosure may be applied will be described firstly. FIG. 1 is a side view illustrating a wheel loader 10 according to an embodiment of the present disclosure.

As illustrated in FIG. 1, the wheel loader 10 includes a front frame 12, a rear frame 14, front wheels 26, rear wheels 27, a work implement 16, a cab (an operator's compartment) 30, and a rear structure 18.

In the following description, the direction in which the wheel loader 10 travels straight is defined as a front-rear direction of the wheel loader 10. In the front-rear direction of the wheel loader 10, the side on which the work implement 16 is disposed relative to the front frame 12 and the rear frame 14 is defined as a front side, and the side opposite to the front side is defined as a rear side. The left-right direction of the wheel loader 10 is defined as a direction orthogonal to the front-rear direction in planar view. The right side and the left side in the left-right direction when viewed from the front direction correspond to the right direction and the left direction, respectively. The vertical direction of the wheel loader 10 is defined as a direction orthogonal to a plane defined by the front-rear direction and the left-right direction. In the vertical direction, the side downward the ground is defined as a lower side, and the side upward the sky is defined as an upper side.

The front-rear direction corresponds to the front-rear direction of the operator sitting on a driver's seat in the cab 30. The left-right direction corresponds to the left-right direction of the operator sitting on the driver's seat. The left-right direction corresponds to the width direction of the wheel loader 10. The vertical direction corresponds to the vertical direction of the operator sitting on the driver's seat. The direction facing the operator sitting on the driver's seat corresponds to the front direction, and the direction behind the operator sitting on the driver's seat corresponds to the rear direction. The right side and the left side when the operator is sitting on the driver's seat and facing toward the front correspond to the right direction and the left direction, respectively. The side down to the feet of the operator sitting on the driver's seat corresponds to the lower side, and the side upper to the head corresponds to the upper side.

The front frame 12 and the rear frame 14 constitute an articulate body frame. The front frame 12 is provided in front of the rear frame 14. The front frame 12 is rotatably coupled to the rear frame 14 by a center pin (not shown). The center of rotation of the front frame 12 relative to the rear frame 14 corresponds to an axis extending in the vertical direction.

The front frame 12 is coupled to the rear frame 14 via steering cylinders (not shown). The steering cylinders are provided in pairs on the left side and the right side, respectively. The front frame 12 rotates to the left side or to the right side about the center pin as one steering cylinder extends and the other steering cylinder contracts or vice versa.

The front wheels 26 and the rear wheels 27 are travelling wheels of the wheel loader 10. The front wheels 26 are provided on the front frame 12. The front wheels 26 are provided in pairs on the left side and the right side, respectively. The rear wheels 27 are provided on the rear frame 14. The rear wheels 27 are provided in pairs on the left side and the right side, respectively.

The work implement 16 is provided on the front frame 12. The work implement 16 includes a boom 21, a bucket 24, a boom cylinder 21A, a bell crank 22, a bucket cylinder 24A, and a link 23.

The cab 30 and the rear structure 18 are provided on the rear frame 14. The cab 30 is provided behind the work implement 16. The operator enters the room of the cab 30 and operates the wheel loader 10. The operator gets into the cab 30 so as to drive the wheel loader 10 and operate the work implement 16.

The rear structure 18 is provided behind the cab 30. The rear structure 18 includes a hydraulic oil tank, an engine, a hydraulic pump, and the like. The front frame 12, the rear frame 14 and the rear structure 18 constitute the body of the wheel loader 10.

[Configuration of Cab 30]

Next, the configuration of the cab 30 will be described. The cab 30 includes a cab body 31. The cab body 31 defines an interior space of the cab 30. The cab body 31 is formed by assembling steel plates and transparent windows in combination.

The cab body 31 has a hexagonal shape in top view. The cab body 31 includes a front surface 32, a rear surface 33, a left surface 34, a right surface, a diagonally left front surface 36, and a diagonally right front surface.

The front surface 32 is provided facing forward. The rear surface 33 is provided facing rearward. The length of the front surface 32 in the left-right direction is shorter than the length of the rear surface 33 in the left-right direction. The right surface is provided facing rightward. The right surface is disposed between the front surface 32 and the rear surface 33. The right surface is continuous with the right end of the rear surface 33. The left surface 34 is provided facing leftward. The left surface 34 is disposed between the front surface 32 and the rear surface 33. The left surface 34 is continuous with the left end of the rear surface 33.

The diagonally left front surface 36 is provided facing diagonally left forward. The diagonally left front surface 36 is disposed between the front surface 32 and the left surface 34. The diagonally left front surface 36 is continuous with the left end of the front surface 32 and the front end of the left surface 34. The diagonally right front surface is provided facing diagonally right forward. The diagonally right front surface is disposed between the front surface 32 and the right surface. The diagonally right front surface is continuous with the right end of the front surface 32 and the front end of the right surface. The distance between the diagonally left front surface 36 and the diagonally right front surface in the left-right direction decreases from the rear side toward the front side.

The cab body 31 of the cab 30 is not limited to the hexagonal shape in top view as described above, and it may have, for example, a rectangular shape in top view.

The cab 30 includes a left door 61 and a right door. Both the left door 61 and the right door are provided on the cab body 31 so that they may be opened or closed as necessary. The left door 61 is provided on the left side of the cab body 31. The door 61 is provided on the left surface 34. The door 61 is an automatic door that may be opened and closed automatically. The right door is provided on the right side of the cab body 31. The right door is provided on the right surface. The right door is a manual door that may be opened and closed manually.

[Configuration of Door 61]

Next, the configuration of the door 61 and the configuration around the door 61 will be described.

The cab body 31 is formed with a doorway. The doorway is an entrance provided in the cab body 31 for the operator to get in and out of the cab 30. The doorway has a rectangular shape as a whole in which the vertical direction corresponds to the longitudinal direction. The doorway is provided on the left surface 34 and the right surface, respectively.

The door 61 is provided for the doorway which is provided on the left surface 34. The door 61 may be rotated between a closed position (a position illustrated in FIG. 1 and FIGS. 2 and 3 to be described later) in which the doorway is closed and an open position (a position illustrated in FIG. 4 to be described later) in which the doorway is opened. The door 61 is configured to open and close the doorway.

The door 61 includes a hinge 62. The door 61 is rotatably supported on the cab body 31 via the hinge 62. The door 61 is configured to be rotatable around the hinge 62 between the closed position and the open position. The door 61 is configured to open outward from the cab 30. The door 61 is a rear hinge door in which the hinge 62 is arranged at the rear side of the doorway.

The rotation angle of the door 61 from the closed position to the open position is greater than 90°. Preferably, the rotation angle of the door 61 from the closed position to the open position is 120° or more.

When the door 61 is at the closed position, the door 61 is parallel to the left surface 34. When the door 61 is at the open position, the door 61 extends diagonally left rearward from the rear end of the opening formed by the doorway. The door 61 at the open position is located rearward than the doorway.

The wheel loader 10 further includes a ladder 41. The cab 30 is arranged above the ladder 41. The ladder 41 is used by the operator to move up and down between the ground and the cab 30.

The ladder 41 is attached to the rear frame 14. The ladder 41 includes a plurality of steps 42. Each step 42 serves as a foothold on which the operator steps. The plurality of steps 42 are arranged at an interval in the vertical direction.

Figure 2:
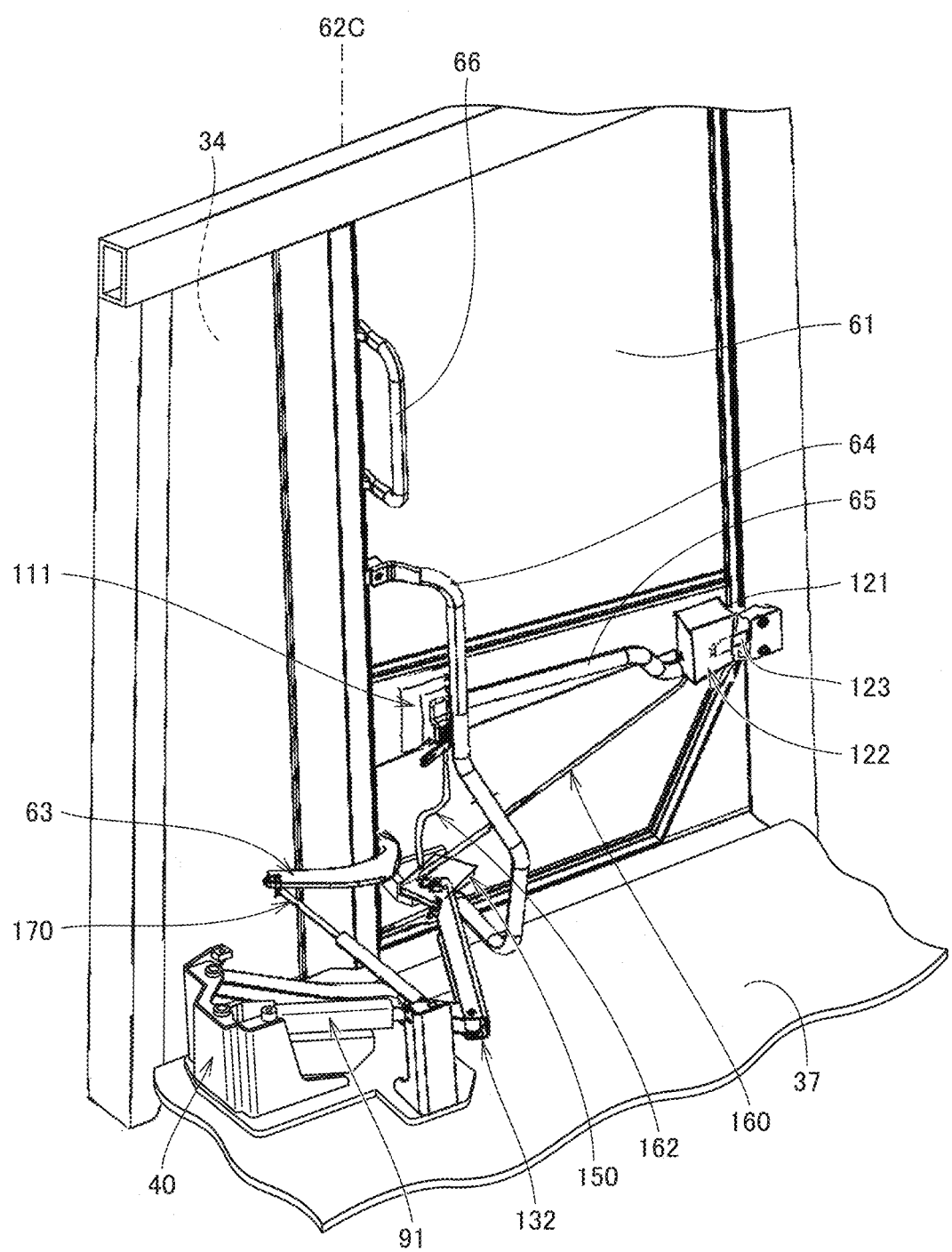
FIG. 2 is a perspective view illustrating a door at a closed position when viewed from the inside of a cab.

FIG. 2 is a perspective view illustrating the door 61 at the closed position when viewed from the inside of the cab 30. As illustrated in FIGS. 1 and 2, the wheel loader 10 further includes a handrail 64, a handrail 65, and a handrail 66.

The handrail 64, the handrail 65 and the handrail 66 are used by the operator as handrails to move up and down between the ground and the cab 30 or get in and out of the cab 30. The handrail 64, the handrail 65 and the handrail 66 each is in the form of a bar that may be gripped by the operator.

The handrail 64, the handrail 65 and the handrail 66 are attached to the door 61. The handrail 64, the handrail 65 and the handrail 66 are provided on an indoor surface of the door 61 that is located inside the cab 30 when the door 61 is at the closed position. The handrail 64 and the handrail 66 are adjacent to the rear end of the doorway in the front-rear direction. The handrail 64 and the handrail 66 extend in the vertical direction. The handrail 65 extends in the horizontal direction. When the door 61 is at the open position, the handrail 64, the handrail 65 and the handrail 66 are located outside the cab 30.

[Opening/Closing Operation of Door 61]

Figure 3:
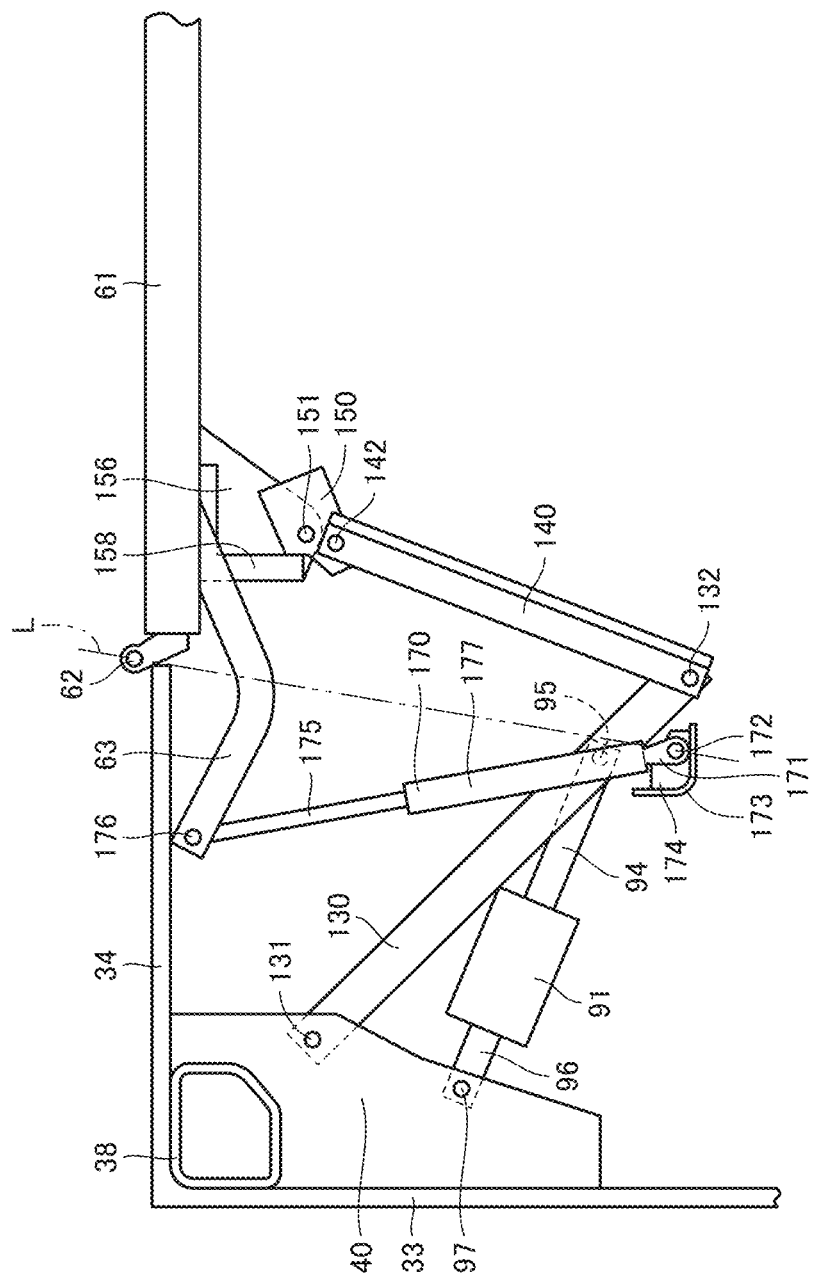
FIG. 3 is a planar view schematically illustrating the configuration of an opening/closing device for the door.

Next, the configuration of a device automatically opening and closing the door 61 will be described. FIG. 3 is a planar view schematically illustrating the configuration of an opening and closing device for the door 61.

As illustrated in FIGS. 2 and 3, the wheel loader 10 further includes an actuator 91. The actuator 91 generates a driving force to move the closed door 61 in the opening direction. The actuator 91 performs an opening operation on the door 61. The opening operation refers to such an operation that the door 61 is moved from the closed position to the open position. The actuator 91 further generates a driving force to move the opened door 61 in the closing direction. The actuator 91 performs a closing operation on the door 61. The closing operation refers to such an operation that the door 61 is moved from the open position to the closed position.

The actuator 91 includes a rod 94 and a support 96. The rod 94 can do reciprocating motion, and the length of the rod 94 protruding from the actuator 91 is extendable. The actuator 91 is supported on the cab body 31 via the support 96. As illustrated in FIG. 3, a bracket 40 is fixed on a floor 37 of the cab body 31. A coupling pin 97 is inserted through a through hole formed in the bracket 40 to fix the support 96. Thus, the support 96 (the actuator 91) is fixed to the cab body 31 in such a manner that it is rotatable about the coupling pin 97.

As illustrated in FIG. 1, the wheel loader 10 further includes an operation unit 70. The operation unit 70 is operated by the operator when the operator opens or closes the door 61. The operation unit 70 includes, for example, a push button to be pressed by the operator. The operation unit 70 may include an open button for opening the door 61 and a close button for closing the door 61.

The operation unit 70 includes a first operation unit (not shown) provided inside the cab 30 and a second operation unit 76 provided outside the cab 30. The first operation unit is used by the operator to open or close the door 61 from the inside of the cab 30. The first operation unit is attached to, for example, a right front pillar of the cab 30. The second operation unit 76 is used by the operator to open or close the door 61 from the outside of the cab 30. The second operation unit 76 is attached to the ladder 41.

As illustrated in FIG. 2, the wheel loader 10 further includes an open position locking unit 111 and a closed position locking unit 121. The closed position locking unit 121 is configured to lock the door 61 at the closed position. The open position locking unit 111 is configured to lock the door 61 at the open position.

The closed position locking unit 121 is provided inside the cab 30. The closed position locking unit 121 includes a movable catcher 122 and a striker 123 that may be engaged with the catcher 122. The catcher 122 is provided on the indoor surface of the door 61. The striker 123 is attached to the left front pillar of the cab 30. When the catcher 122 is engaged with the striker 123, the door 61 is locked at the closed position (locking operation). When the catcher 122 is disengaged from the striker 123, the door 61 is released from the closed position (unlocking operation).

The open position locking unit 111 is provided on the indoor surface of the door 61. Similar to the closed position locking unit 121, the open position locking unit 111 includes a movable latch and a striker that may be engaged with the latch.

The wheel loader 10 further includes a power transmission device that transmits a driving force generated by the actuator 91 to the door 61. The power transmission device includes a first link 130, a second link 140, and a third link 150.

The first link 130 and the second link 140 each is in the form of a rod. Similar to the support 96 of the actuator 91, the base end of the first link 130 is rotatably attached to the bracket 40 by a coupling pin 131. The distal end of the first link 130 is coupled to the base end of the second link 140 by a coupling pin 132 in such a manner that they are rotatable relative to each other. The rod 94 of the actuator 91 is coupled to a position between the base end and the distal end of the first link 130 by a coupling pin 95 in such a manner that they are rotatable relative to each other.

The third link 150 is in the form of a plate. The third link 150 is rotatable relative to the cab body 31 and rotatable relative to the door 61 about a rotation shaft 151. The distal end of the second link 140 is coupled to the third link 150 by a coupling pin 142 in such a manner that they are rotatable relative to each other.

The peripheral edge of the third link 150 may come into contact with a contact member 158 formed integrally with the door 61. The contact member 158 is included in the power transmission device that transmits a driving force generated by the actuator 91 to the door 61. When a part of the peripheral edge of the third link 150 comes into contact with a part of the contact member 158, the driving force for opening the door 61 is transmitted to the door 61. When the other part of the periphery edge of the third link 150 comes into contact with the other part of the contact member 158, the driving force for closing the door 61 is transmitted to the door 61.

Figure 4:
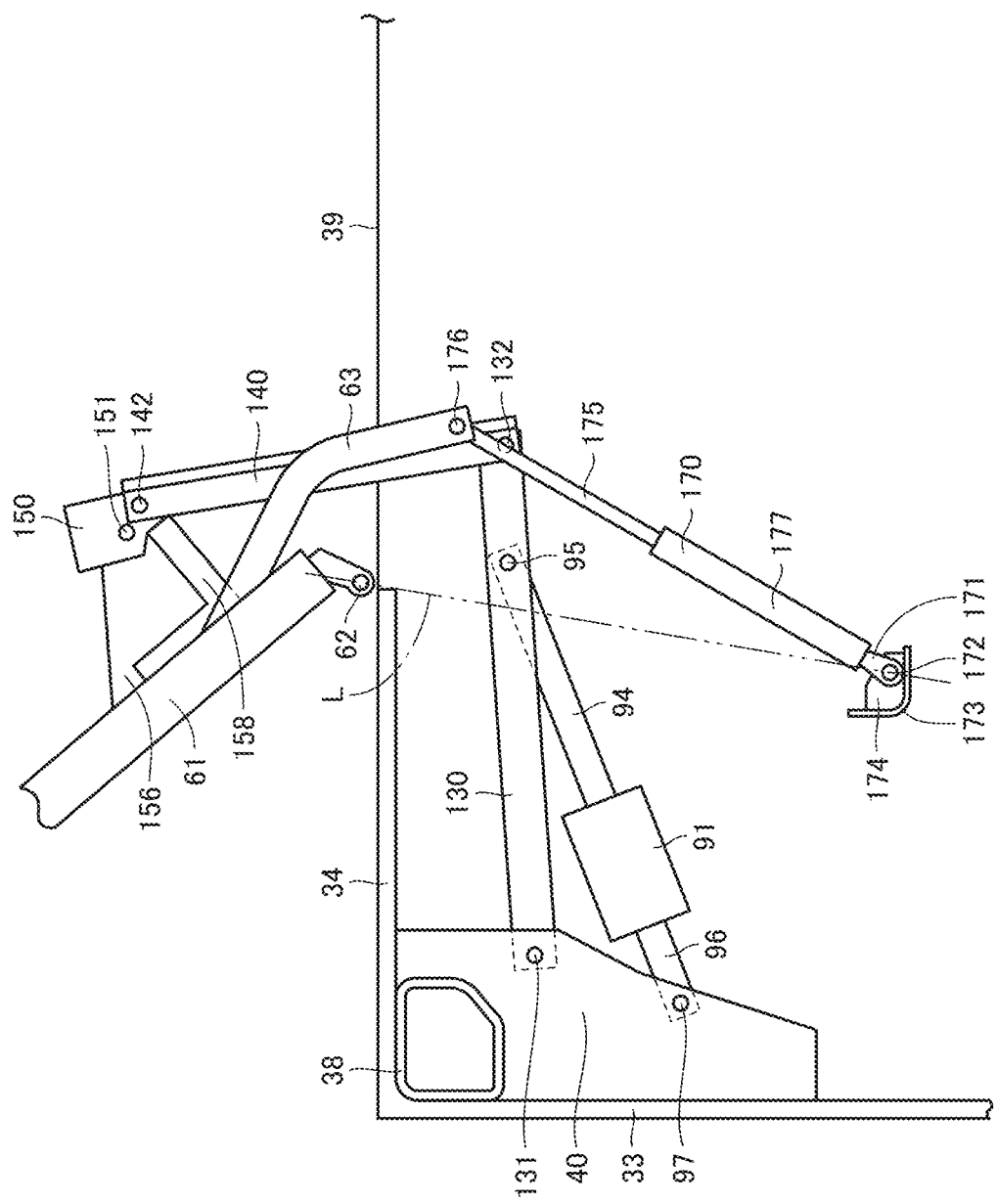
FIG. 4 is a planar view schematically illustrating the configuration of the opening/closing device when the door is at the open position.

As illustrated in FIG. 2, the third link 150 is coupled to a locking link 160 in the form of a cable and a locking link 162 in the form of a cable. In FIG. 3 and FIG. 4 to be described later, the locking link 160 and the locking link 162 are not drawn for simplicity of illustration.

The locking link 160 is coupled to the catcher 122 of the closed position locking unit 121. When the driving force of the actuator 91 is transmitted to the catcher 122 via the locking link 160, the catcher 122 is disengaged from the striker 123, and thereby, the door 61 that is locked by the closed position locking unit 121 is released. The driving force to unlock the door 61 that is locked by the closed position locking unit 121 is generated by the actuator 91.

The locking link 162 is coupled to the latch of the open position locking unit 111. When the driving force of the actuator 91 is transmitted to the latch via the locking link 162, the latch is disengaged from the striker, and thereby, the door 61 that is locked by the open position locking unit 111 is released. The driving force to unlock the door 61 that is locked by the open position locking unit 111 is generated by the actuator 91.

As illustrated in FIGS. 2 and 3, the wheel loader 10 further includes a gas spring 170. The gas spring 170 includes a cylinder 177, a rod 175, and a mount 171. The cylinder 177 is sealed with compressed gas. The rod 175 can reciprocate relative to the cylinder 177. The rod 175 is biased by the pressure of the compressed gas in a direction of extending from the cylinder 177. Therefore, the gas spring 170 is biased to increase its length.

The cab body 31 includes a bracket 174. The bracket 174 is fixed on the floor 37 of the cab body 31 via a fixing seat 173. The mount 171 of the gas spring 170 is coupled to the bracket 174 by a coupling pin 172 in such a manner that they are rotatable relative to each other. The rod 175 is coupled to a gas spring fixing bracket 63 by a coupling pin 176 in such a manner that they are rotatable relative to each other. The gas spring fixing bracket 63 is attached to the indoor surface of the door 61, and is formed integrally with the door 61.

The straight line L indicated by a two-dot chain line in FIG. 3 is such a straight line that passes through the center of the hinge 62 (a hinge center 62C illustrated in FIG. 2) and the center of the coupling pin 172 of the gas spring 170. When the door 61 illustrated in FIG. 3 is at the closed position, the coupling pin 176 that couples the gas spring 170 and the door 61 (the gas spring fixing bracket 63) is located in the rear of the straight line L. The door 61 illustrated in FIG. 3 is subjected to a force in the clockwise direction around the hinge 62 from the gas spring 170. The door 61 at the closed position is biased by the gas spring 170 in the closing direction.

FIG. 4 is a planar view schematically illustrating the configuration of the opening/closing device when the door is at the open position. As illustrated in FIG. 4, when the rod 94 of the actuator 91 extends, the first link 130 is forced to rotate counterclockwise about the coupling pin 131, whereby the second link 140 and the third link 150 are moved toward the outside of the cab 30.

The driving force of the actuator 91 is applied to the door 61 via the first link 130, the second link 140, and the third link 150. Upon receiving the driving force, the door 61 is forced to rotate counterclockwise around the hinge 62, and is moved to the open position. FIG. 4 illustrates that the doorway 39 is open. When the door 61 is at the open position, the actuator 91 is completely located inside the cab body 31 without being located outside the cab 30.

When the door 61 illustrated in FIG. 4 is at the open position, the coupling pin 176 that couples the gas spring 170 and the door 61 (the gas spring fixing bracket 63) is located in front of the straight line L. The door 61 illustrated in FIG. 4 is subjected to a force in the counterclockwise direction around the hinge 62 from the gas spring 170. The door 61 at the open position is biased by the gas spring 170 in the opening direction. The gas spring 170 constitutes the biasing member of the present embodiment that biases the door 61 in both the closing direction and the opening direction.

As described above, when the coupling pin 176 is located in the rear of the straight line L, the gas spring 170 biases the door 61 in the closing direction. When the coupling pin 176 is located in front of the straight line L, the gas spring 170 biases the door 61 in the opening direction. When the door 61 is at a specific position between a fully closed state and a fully open state, the coupling pin 176 is located on the straight line L.

Figure 5:
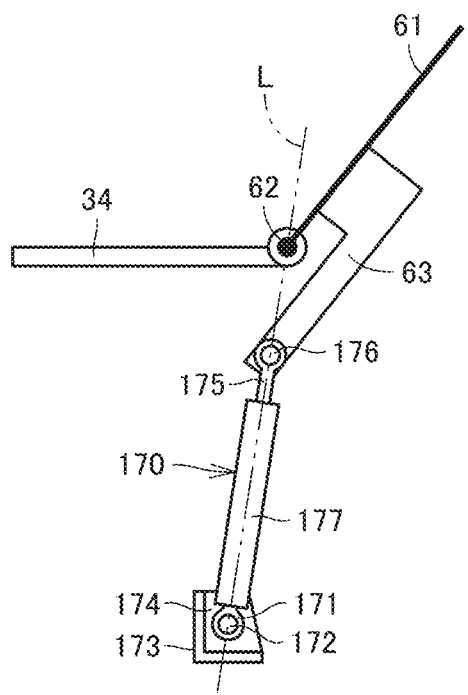
FIG. 5 is a schematic planar view illustrating a position of the door where a coupling pin is located on a straight line L.
Figure 6:
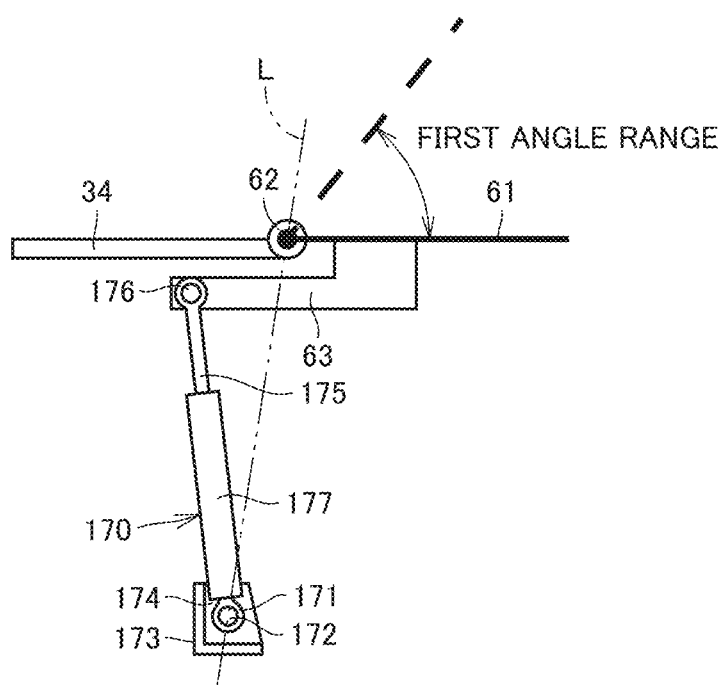
FIG. 6 is a schematic planar view illustrating a first angle range.
Figure 7:
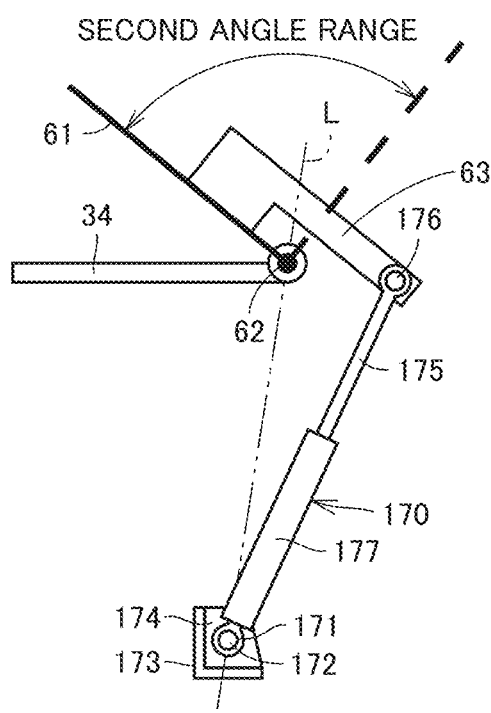
FIG. 7 is a schematic planar view illustrating a second angle range.

FIG. 5 is a schematic planar view illustrating a position of the door 61 where the coupling pin 176 is located on the straight line L. FIG. 6 is a schematic planar view illustrating a first angle range. FIG. 7 is a schematic planar view illustrating a second angle range. The door 61 illustrated in FIG. 6 is at the closed position. The door 61 illustrated in FIG. 7 is at the open position. In FIGS. 6 and 7, the broken line illustrates the position of the door 61 when the coupling pin 176 is located on the straight line L as illustrated in FIG. 5.

As illustrated in FIG. 6, the range between the closed position and the position of the door 61 where the coupling pin 176 is located on the straight line L is referred to as a first angle range. As illustrated in FIG. 7, the range between the open position and the position of the door 61 where the coupling pin 176 is located on the straight line L is referred to as a second angle range. The first angle range and the second angle range each represents a partial range of the rotation angle of the door 61 relative to the cab body 31. The first angle range includes a state when the door 61 is fully closed. The second angle range includes a state when the door 61 is fully open. When the door 61 is positioned in the first angle range, the coupling pin 176 is located in the rear of the straight line L. When the door 61 is positioned in the second angle range, the coupling pin 176 is located in front of the straight line L.

When the door 61 is positioned in the first angle range, the biasing force that biases the rod 175 of the gas spring 170 to extend generates a clockwise moment around the hinge 62 in FIG. 6. When this moment acts on the door 61 via the coupling pin 176 and the gas spring fixing bracket 63, the door 61 is biased in the clockwise direction around the hinge 62. The gas spring 170 biases the door 61 in the closing direction when the door 61 is positioned in the first angle range.

When the door 61 is in the second angle range, the biasing force that biases the rod 175 of the gas spring 170 to extend generates a counterclockwise moment around the hinge 62 in FIG. 7. When this moment acts on the door 61 via the coupling pin 176 and the gas spring fixing bracket 63, the door 61 is biased in the counterclockwise direction around the hinge 62. The gas spring 170 biases the door 61 in the opening direction when the door 61 is positioned in the second angle range.

When the door 61 is moved from the open position to the closed position, the length of the rod 94 of the actuator 91 is decreased, and a driving force to move the door 61 in the closing direction is transmitted from the actuator 91 to the door 61. When the door 61 is positioned in the second angle range, the gas spring 170 biases the door 61 in the opening direction. However, the door 61 is forced to move in the closing direction by the driving force of the actuator 91 against the biasing force of the gas spring 170.

When the door 61 is positioned in the first angle range, the door 61 is forced to move in the closing direction by the biasing force of the gas spring 170. At this time, no driving force is applied by the actuator 91 to move the door 61 in the closing direction. While the door 61 is being moved in the closing direction, when the position of the door 61 is changed from the second angle range to the first angle range, the driving force generated by the actuator 91 cannot be transmitted to the door 61. The switching of the power transmission is performed by the rotation of the third link 150 around the rotation shaft 151.

More specifically, as illustrated in FIGS. 3 and 4, the third link 150 is configured to rotate relative to the cab body 31 and rotate relative to the door 61. Due to the rotation of the third link 150, the driving force generated by the actuator 91 is not transmitted to the door 61. The third link 150 functions as a play member in the present embodiment which provides a play in a path for transmitting the driving force generated by the actuator 91 to the door 61. The door 61 is supported by the third link 150 with a play relative to the cab body 31.

Function and Effects

Next, the function and effects of the present embodiment will be described.

In the present embodiment, as illustrated in FIG. 3, the cab 30 includes a gas spring 170 which biases the door 61 in the closing direction. Since the gas spring 170 biases the door 61 in the closing direction after the door 61 locked by the closed position locking unit 121 is released, the door 61 is prevented from being opened unintentionally. Even though the door 61 is slightly opened, it will be automatically closed by the biasing force of the gas spring 170. Therefore, according to the cab 30 of the present embodiment, it is possible to prevent the door 61 at the closed position from being opened against the operator's intention.

As illustrated in FIG. 3, the cab 30 includes an actuator 91. The actuator 91 generates a driving force to move the closed door 61 in the opening direction. Thus, the door 61 can be moved from the closed position to the open position by the driving force generated by the actuator 91.

As illustrated in FIGS. 4 and 7, when the door 61 is positioned in the second angle range in which the door 61 is fully opened or almost fully opened, the gas spring 170 biases the door 61 in the opening direction. Since the gas spring 170 biases the door 61 in the opening direction after the door 61 locked by the open position locking unit 111 is released, the door 61 is prevented from being closed unintentionally. Therefore, it is possible to prevent the door 61 at the open position from being closed against the operator's intention.

The actuator 91 further generates a driving force to move the opened door 61 in the closing direction. Since a single actuator 91 may be used to generate a driving force to move the door 61 in the opening direction and a driving force to move the door 61 in the closing direction, it is possible to simplify the configuration and reduce the cost.

As illustrated in FIGS. 2 to 4, the cab 30 includes a third link 150 in a power transmission device that transmits the driving force generated by the actuator 91 to the door 61. The third link 150 provides a play that prevents the driving force generated by the actuator 91 from being transmitted to the door 61. When the door 61 is moved in the closing direction to the first angle range (FIG. 6) in which the door 61 is fully closed or almost fully closed, the driving force generated by the actuator 91 is not transmitted to the door 61.

As mentioned above, while the door 61 is being moved in the closing direction, no driving force is applied from the actuator 91, the door 61 is closed only by the biasing force of the gas spring 170, and thus, the door 61 biased in the closing direction by the gas spring 170 is supported by the actuator 91. Thereby, even if the operator's finger or arm is caught between the door 61 that is being closed and the cab body 31, the operator may quickly pull out his/her arm before an excessively great force is applied to the operator's finger or arm.

The play between the cab body 31 and the door 61 may be realized by, for example, forming a slot in the third link 150 and engaging the second link 140 in the slot of the third link 150. Thus, the play is provided by the relative rotation of the plate-shaped third link 150 of the present embodiment, which makes it possible to improve the durability of the play member which provides the play.

As illustrated in FIGS. 3 and 4, the power transmission device including the third link 150 as a play member between the actuator 91 and the door 61 has been described. The arrangement of the play member in the power transmission device is not limited to that in the example of the present embodiment. For example, the play member for providing a play may be arranged between the actuator 91 and the cab body 31.

The gas spring 170 has been described as an example of the biasing member that biases the door 61 in the closing direction and the opening direction. However, the biasing member is not limited to the gas spring 170, it may be any biasing member such as a coil spring or the like. However, it is advantageous to use the gas spring 170 since it may reduce the biasing member in size or it is easier to control the opening and closing movement of the door 61.

The present disclosure is applicable to various work machines including a cab. The work machine described in the present disclosure is not limited to a wheel loader, it may be a bulldozer, a hydraulic excavator, a motor grader, a crane or a forestry machine.

It should be understood that the embodiments disclosed herein have been presented for the purpose of illustration and description but not limited in all aspects. It is intended that the scope of the present invention is not limited to the description above but defined by the scope of the claims and encompasses all modifications equivalent in meaning and scope to the claims.

REFERENCE SIGNS LIST

10: wheel loader; 16: work implement; 30: cab; 31: cab body; 34: left surface; 38: left rear pillar; 39: doorway; 40: bracket; 61: door; 62: hinge; 62c: hinge center; 63: gas spring fixing bracket; 70: operation unit; 76: second operation unit; 91: actuator; 94, 175: rod; 95, 97, 131, 132, 142, 172, 176: coupling pin; 96: support; 111: open position locking unit; 121: closed position locking unit; 122: catcher; 123: striker; 130: first link; 140: second link; 150: third link; 151: rotation shaft; 160: locking link; 162: locking link; 170: gas spring; 171: mount; 173: fixing seat; 174: bracket; 177: cylinder; L: straight line

The invention claimed is:

1. A cab for a work machine, the cab comprising:
a cab body which is formed with a doorway;
a door which is rotatably supported on the cab body so as to open and close the doorway;
a biasing member which biases the door in a closing direction; and
an actuator that generates a driving force to move the closed door in an opening direction,
wherein the biasing member biases the door in the closing direction when a rotation angle of the door relative to the cab body is in a first angle range which includes a fully closed state, and biases the door in the opening direction when the rotation angle is in a second angle range which includes a fully open state and is larger than the first angle range.

2. The work machine cab according to claim 1, wherein the actuator further generates a driving force to move the opened door in the closing direction.

3. The cab for a work machine according to claim 2, further comprising a power transmission device that transmits the driving force generated by the actuator to the door,
the power transmission device includes a play member, and
the play member provides a play that prevents the driving force generated by the actuator from being transmitted to the door.

4. The cab for a work machine according to claim 3, wherein
while the door is being moved in the closing direction, the play member transmits the driving force generated by the actuator to the door if the rotation angle is in the second angle range, and prevents the drive force generated by the actuator from being transmitted to the door if the rotation angle is changed from the second angle range to the first angle range.

5. A work machine comprising:
a work implement; and a cab according to claim 1, in which an operator who operates the work implement is seated.

\* \* \* \* \*